United States Patent [19]

Jacobsen et al.

[11] 4,302,635

[45] Nov. 24, 1981

[54] HEADPHONE CONSTRUCTION

[75] Inventors: Wayno A. Jacobsen, Shorewood, Wis.; James P. Thomsen, Mt. Prospect, Ill.

[73] Assignee: Koss Corporation, Milwaukee, Wis.

[21] Appl. No.: 109,504

[22] Filed: Jan. 4, 1980

[51] Int. Cl.[3] .......................... H04M 1/05; H04R 1/10

[52] U.S. Cl. .......................... 179/156 R; 179/182 R

[58] Field of Search .......... 179/156 R, 156 A, 182 R, 179/182 A, 103, 180; 2/209

[56] References Cited

U.S. PATENT DOCUMENTS

| | | | |
|---|---|---|---|
| 2,989,598 | 6/1961 | Touger et al. | 179/182 R |
| 3,447,160 | 6/1969 | Teder | 179/156 R |
| 3,579,640 | 5/1971 | Beguin et al. | 179/156 R |
| 3,787,899 | 1/1974 | Krawagna | 179/156 R |
| 3,875,592 | 4/1975 | Aileo | 179/182 R |
| 4,027,113 | 5/1977 | Matsumoto et al. | 179/156 R |
| 4,041,256 | 8/1977 | Ohta et al. | 179/182 R |
| 4,058,688 | 11/1977 | Nishimura et al. | 179/156 R |
| 4,156,118 | 5/1979 | Hargrave | 179/182 R |

*Primary Examiner*—Gerald L. Brigance
*Attorney, Agent, or Firm*—Quarles & Brady

[57] ABSTRACT

A headphone includes a pair of ear cup assemblies attached to a headband. Each ear cup assembly includes a cushion, an earplate, a back plate and an acoustic transducer. These elements snap together and are held together by integral fasteners. Each ear cup assembly is attached to the headband by a ring-shaped yoke which is entrapped between the assembled back plate and ear plate. The result is a durable, lightweight structure which is easy to assemble on a mass production basis.

18 Claims, 6 Drawing Figures

HEADPHONE CONSTRUCTION

BACKGROUND OF THE INVENTION

The field of the invention is headphones, and particularly, high quality headphones which are mass produced for the high fidelity market.

High quality headphones which are intended to reproduce high fidelity sound are manufactured in many shapes and sizes. Most of them, however, include one or more acoustic transducers which are held over the user's ears by a supporting structure which also encloses the acoustic transducer and provides an aesthetically pleasing appearance. In many headphones this supporting structure takes the form of a pair of ear cup assemblies which are held in place over the user's ears by a headband.

Because headphones may be worn for extended periods of time, user comfort is a major consideration in their design. This requires not only that the weight of the headphone be kept to a minimum, but also, that the ear cup assemblies be aligned correctly over the user's ears. The latter requirement is accomplished best by enabling each ear cup assembly to pivot about both a vertical axis and a horizontal axis. Numerous supporting structures which provide pivotal connection of the ear cup assemblies to the headband are known, and in most cases such structures include numerous parts which must be assembled with fasteners during manufacture.

SUMMARY OF THE INVENTION

The present invention relates to a headphone structure for supporting an acoustic transducer over the user's ear, which structure includes a minimal number of parts which are easily assembled during manufacture. More specifically, the headphone structure includes an earplate having first integrally formed snap action fastener means and second integrally formed snap action fastening means, an acoustic transducer mounted to the ear plate and fastened in position on its back surface by said first snap action fastening means, a back plate mounted to the ear plate and fastened in position over the acoustic transducer by said second snap action fastening means, and a yoke for attaching the headphone structure to a headband, the yoke being entrapped in a channel formed between the ear plate and the back plate.

A general object of the invention is to provide an easily assembled headphone structure. Each ear cup assembly includes four basic elements which are fastened together with integrally formed fastening devices. Parts are thus minimal in number and assembly requires only the application of force to operate the snap action fastening mechanisms. No fastener is required for the yoke which is held in place by entrapping it in a channel formed between the assembled ear plate and back plate.

A more specific object of the invention is to provide a reliable means for pivotally connecting an ear cup assembly to the yoke. Bearing surfaces are formed on the ear plate and the back plate and these form the channel in which the yoke is entrapped. These surfaces are contoured to form U-shaped constrictions on opposite sides of the ear cup assembly and the legs on the yoke are formed with bights that fit within these constrictions. The bearing surfaces adjacent to the constrictions are sloped to widen away from the constrictions and the resulting assembly enables the ear cup assembly to pivot about a horizontal axis which passes through the constricted regions. Pivotal motion is limited in both directions by the engagement of the yoke with a bearing surface.

Another specific object of the invention is to provide an easily assembled and removable ear cushion for a headphone. A third snap action fastener means is integrally formed on the front surface of the ear plate and an ear cushion having a molded annular shaped support disc is fastened to the front of the ear plate by the third snap action fastener means.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
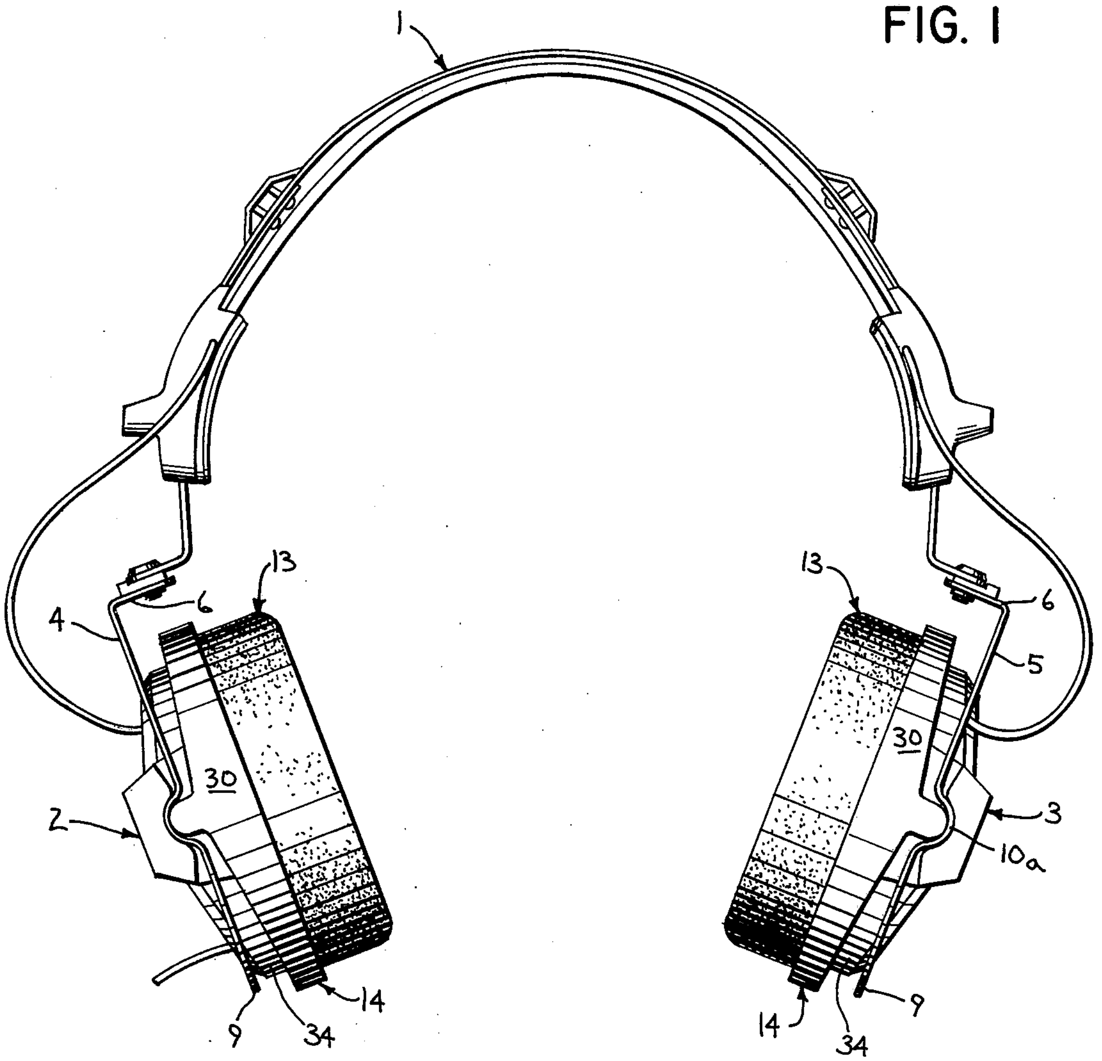
FIG. 1 is a side elevation view of a headphone which incorporates the present invention.

Referring particularly to FIG. 1, the headphone of the present invention includes a headband 1 which supports a pair of ear cup assemblies 2 and 3 over the ears of a user. Each cup assembly 2 and 3 is attached to the headband 1 by a metal yoke 4 and 5 respectively. Each yoke 4 and 5 includes a bracket portion 6 which is fastened to one end of the headband 1 by a rivet that enables the yokes 4 and 5 to swivel. In this manner, the ear cup assemblies 2 and 3 are mounted to the headband 1 for pivotal motion about verticle axes. The yokes 4 and 5 as well as the ear cup assemblies 2 and 3 are identical, and although the drawings and the following description refer to the yoke 5 and the ear cup assembly 3, the same applies to the ear cup assembly 2 and yoke 4.

Figure 2:
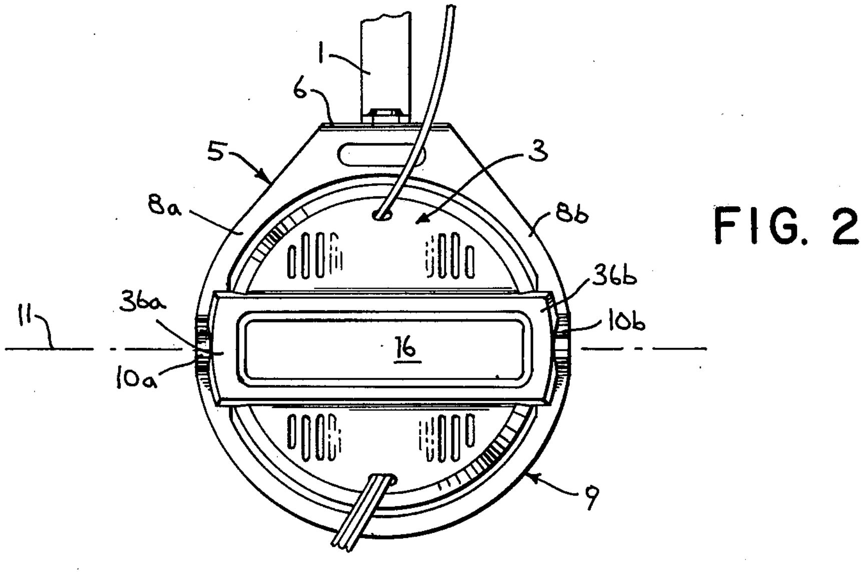
FIG. 2 is a back elevation view of a portion of the headphone of FIG. 1.
Figures 3, 6:
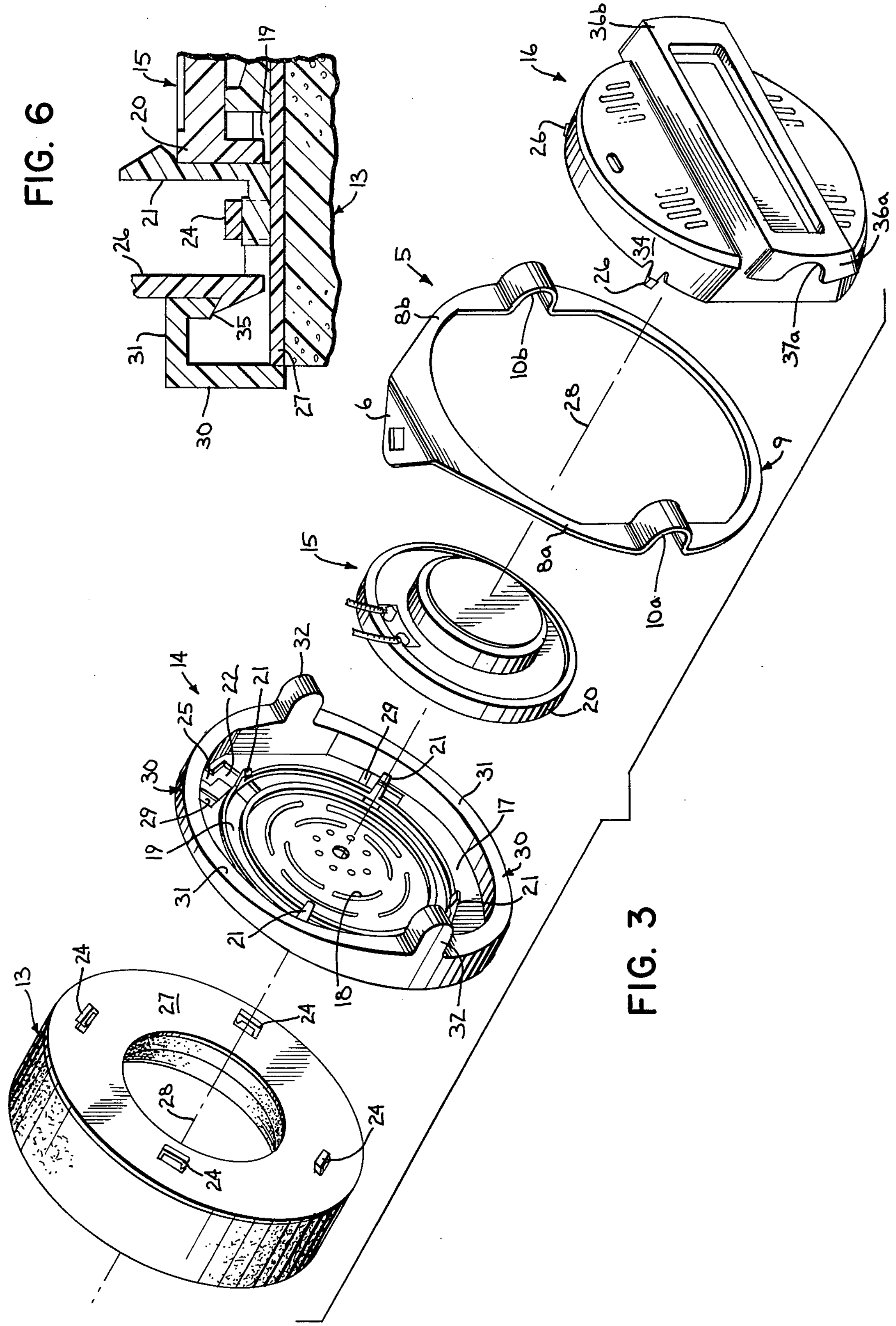
FIG. 3 is an exploded perspective view of one ear cup and yoke which forms part of the headphone of FIG. 1.
FIG. 6 is a cross section through the headphone of FIG. 1.
Figure 4:
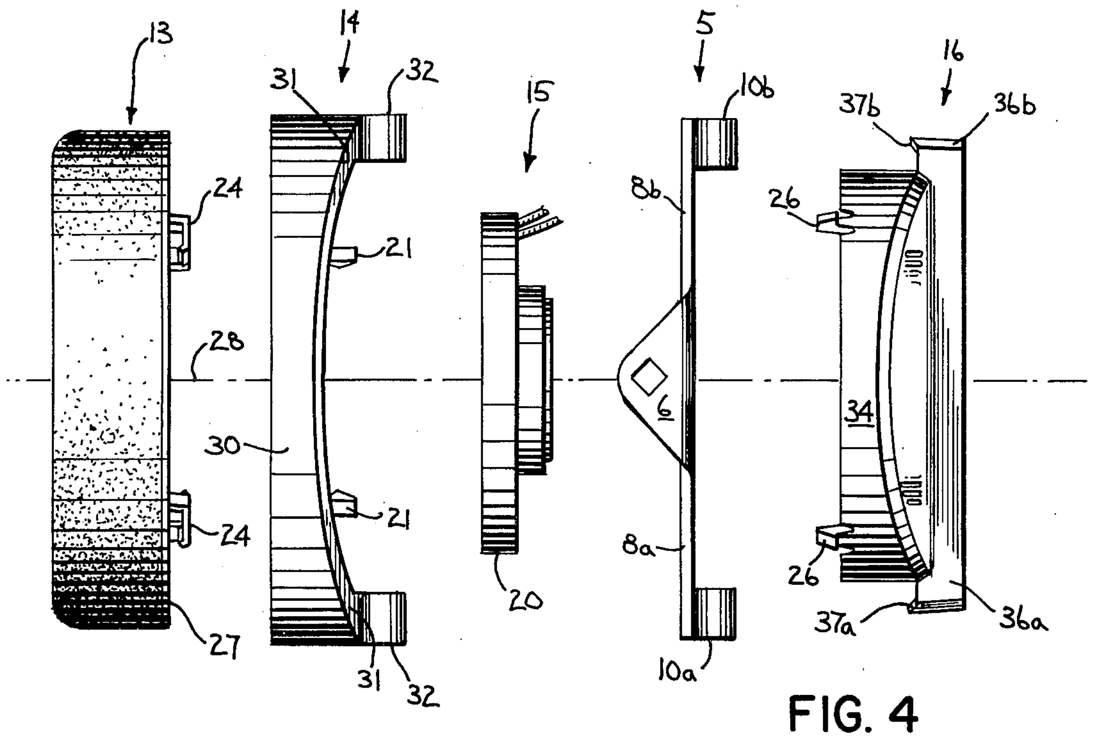
FIG. 4 is an exploded top view of the ear cup and yoke of FIG. 3.

Referring particularly to FIGS. 2–4, the yoke 5 has a pair of legs 8*a* and 8*b* which extend downward and outward from the bracket 6 along a circular path. They connect to one another to form a rigid ring 9 that provides a firm supporting structure for the ear cup assembly 3. The yoke 5 is stamped from metal and semicircular-shaped bights 10*a* and 10*b* are formed in the respective legs 8*a* and 8*b*. The bights 10*a* and 10*b* are located on opposite sides of the ring 9 along a substantially horizontal axis indicated by the dashed line 11 in FIG. 2. As will now be described in more detail, the ear cup assembly 3 is attached to the yoke 5 at the bights 10*a* and 10*b* for pivotal motion about the horizontal axis 11.

As shown best in FIGS. 3 and 4, the ear cup assembly 3 includes four primary elements: an ear cushion 13; a ear plate 14; an acoustic transducer 15; and a back plate 16. The ear plate 14 and the back plate 16 are molded from ABS plastic and the acoustic transducer 15 is a self contained unit which is separately assembled. The cushion 13 is molded from an open cell polyurethane foam as described in co-pending U.S. patent application Ser. No. 91,339 which was filed on Nov. 5, 1979, and which is entitled "Method for Molding Ear Cushions".

Figure 5:
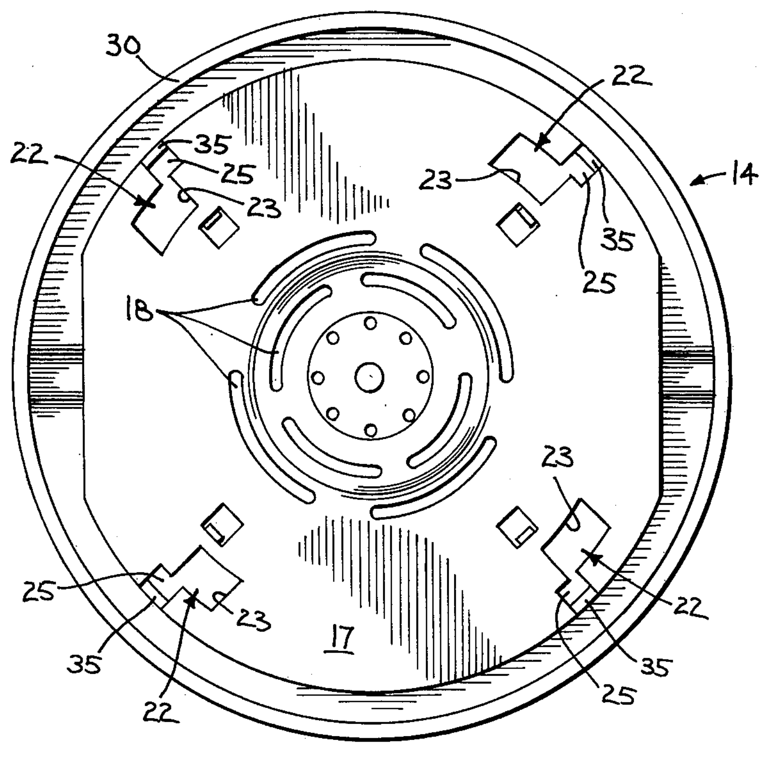
FIG. 5 is a front elevation view of a ear plate which forms part of the headphone of FIG. 1.

Referring particularly to FIGS. 3–5, the ear plate 14 includes numerous elements which are integrally molded and which cooperate to fasten the four basic ear cup assembly elements together and to retain the resulting structure to the yoke 5. These include a circular plate portion 17 that has a centrally located pattern of openings 18 through which sound generated by the acoustic transducer 15 passes. The acoustic openings 18 are formed during the molding process and any number of patterns may be employed to achieve the desired acoustic effects.

As shown in FIG. 3, an annular shaped guideway 19 is formed on the back surface of the plate 17. The guideway 19 is spaced radially outward from and is concentric with the acoustic openings 18. The acoustic transducer 15 has a flange 20 integrally formed around its circular periphery, and this flange 20 is received in the guideway 19 to align the acoustic transducer 15 over the acoustic openings 18. A set of four pawls 21 are molded on the back surface of the ear plate 14 and these are located around the perimeter of the guideway 19. The pawls 21 are deflected outward as the acoustic transducer 15 is inserted into the guideway 19, and when it is in place, the pawls snap over the flange 20 to firmly retain and fasten the acoustic transducer 15 to the ear plate 14.

Located radially outward from the four pawls 21 are four shaped openings 22 which serve as part of fastening means for retaining the ear cushion 13 and the back plate 16 to the ear plate 14. A relatively large rectangular portion 23 of each opening 22 receives a latch 24 on the ear cushion 13 and a smaller portion 25 of each opening 22 receives a pawl 26 on the back plate 16. As shown best in FIGS. 3 and 4, there are four latches 24 formed on the back side of the ear cushion 13. These latches are molded on a flat annular shaped support disc 27 and they extend rearward to form flexible arms that extend completely through the openings 22 in the ear plate 14. The foam portion of the ear cushion 13 is bonded to the front surface of the support disc 27 and when it is rotated clockwise about an earphone sound emitting axis 28, the latches 24 hook the ear plate 14, slide across its rear surface, and snap into recesses 29 which are formed alongside each opening 22. Counterclockwise rotation of the ear cushion 13 unsnaps the latches 24 and enables the ear cushion to be withdrawn for cleaning or replacement.

As shown best in FIG. 4, the ear plate 14 also includes an integrally molded flange 30 which extends completely around the circular plate portion 17. The flange 30 extends rearward from the plate portion 17 to present a rearward directed bearing surface 31. The bearing surface 31 extends completely around the periphery of the ear plate 14 and it is contoured at the left and right sides of the ear plate 14 to form a pair of rearward extending projections 32. When assembled, as shown best in FIG. 2, these projections are received in the bights **10*a* and 10*b* formed in the yoke 5**.

The back plate 16 is molded from ABS plastic and it has a substantially circular periphery which is defined by a forward extending side wall 34. As shown best in FIGS. 3, 4 and 5, the four pawls 26 are molded onto the leading edge of the side wall 34 and are arranged to pass through the openings 22 in the ear plate 14 when the back plate 16 is assembled. The pawls 26 pass through the smaller portions 25 of the openings 22 and they spring radially outward and over locking surfaces 35 formed on the front surface of the ear plate 14. A snap action fastening of the back plate 16 to the ear plate 14 is thus achieved.

As shown best in FIGS. 1–4, when assembled the back plate 16 nests within the raised flange 30 on the ear plate 14 to enclose the back of the acoustic transducer 15. The back plate 16 also includes an integrally molded flange 36 which is formed by two radially extending portions **36*a* and 36*b*. The flange 36 presents a forward directed bearing surface 37 which is divided into two portions 37*a* and 37*b* located on opposite sides of the back plate 14. These bearing surfaces 37*a* and 37*b* are countoured to form notches that receive the bights 10 in the yoke 5**.

As shown best in FIG. 1, the bearing surface 31 formed on the ear plate 14 and the bearing surface 37 formed on the back plate 16 are spaced apart to form a channel in which the yoke 5 is entrapped. This channel is constricted over the contoured regions to snuggly bear against the bights 10 on the yoke 5. Nevertheless, the yoke 5 is free to pivot about the projections 32 and to thus enable the ear cup assembly 3 to adjust to the user's head by pivoting about the horizontal axis 11. The bearing surfaces 31 and 37 are sloped in the region surrounding the constrictions to gradually widen the channel. This enables the ear cup assembly 3 to pivot over a range which is limited by the engagement of the yoke with the bearing surfaces 31 and 37. This motion limiting engagement is distributed over a large portion of the bearing surface 31. Localized stress in the materials is minimized and this enables the use of lighter weight construction which is consistant with the overall design objective of minimizing the weight of the headphone.

The preferred embodiment of the invention provides a headphone construction which is light weight, durable and particularly easy to assemble. It should be apparent, however, that a number of variations can be made from this preferred construction without departing from the invention. For example, numerous variations are possible in the particular construction of the snap action fastening means used to hold the ear cup assembly elements together. Also, variations are possible in the shape of the ear cup assembly elements and in the shape of the yoke. Reference is therefore made to the following claims for a definition of the invention.

We claim:

1. A headphone, the combination comprising:

an ear plate having acoustic openings distributed in a pattern around a sound emitting axis which passes through the ear plate;

an acoustic transducer disposed against the back surface of the ear plate and aligned over the acoustic openings;

first snap action fastening means for fastening the acoustic transducer to the ear plate, said first snap action fastening means having elements which are integrally formed on the ear plate and acoustic transducer;

a back plate disposed against the back surface of the ear plate to form an ear cup assembly which surrounds the acoustic transducer;

second snap action fastening means for fastening the back plate to the ear plate, said second snap action fastening means having elements which are integrally formed on the ear plate and back plate;

a headband for supporting the ear cup assembly over the ear of a listener; and means for attaching the ear cup assembly to the headband.

2. The headphone as recited in claim 1 in which said means for attaching the ear cup assembly to the headband includes a yoke having a bracket which fastens to the headband and having a pair of legs which extend outward and downward from the bracket to make pivotal connection with the ear cup assembly.

3. The headphone as recited in claim 2 in which the pivotal connection of each leg to the ear cup assembly is accomplished by entrapping portions of each between the ear plate and back plate.

4. The headphone as recited in claim 1 in which means for attaching the ear cup assembly to the headband includes a yoke having a bracket which fastens to the headband and a ring which extends downward from the bracket to encircle a portion of the ear cup assembly and to make pivotal connection therewith.

5. The headphone as recited in claim 4 in which the ring includes a pair of bights and the pivotal connection with the ear cup assembly is accomplished by entrapping each bight in a constricted channel which is defined by a pair of opposing bearing surfaces formed respectively on the ear plate and the back plate.

6. The headphone as recited in claim 1 in which the acoustic transducer includes a flange around its periphery which is received in a guideway formed on the back surface of the ear plate and the first snap action fastening means includes pawls which are integrally formed on the back surface of the ear plate and located around the guideway.

7. The headphone as recited in claim 1 in which the second snap action fastening means includes a set of pawls integrally formed on the back plate and a set of corresponding openings in the ear plate through which the pawls extend.

8. The headphone as recited in claim 1 which includes an ear cushion having a support disc attached to its back surface and which includes third snap action fastening means for fastening the ear cushion to the front surface of the ear plate, said third snap action fastening means having elements which are integrally formed on the support disc and the front surface of the ear plate.

9. A headphone, the combination comprising;

an ear cup assembly having an ear plate in which acoustic openings are formed in a pattern about a sound emitting axis which extends through the ear plate and which includes a set of fastener openings disposed in a pattern radially outward from the acoustic openings;

an ear cushion having an annular shaped support disc attached to its back surface; and a set of latches formed on the back surface of the support disc and aligned to extend through the fastener openings and engage the back surface of the ear plate to fasten the cushion to the ear cup assembly.

10. The headphone as recited in claim 9 in which recesses are formed on the back surface of the ear plate adjacent the fastener openings and the latches are moved along the back surface into the recesses by rotating the ear cushion about the sound emitting axis.

11. A headphone, the combination comprising:

an ear plate having acoustic openings disposed in a pattern around a sound emitting axis and having a flange formed on its periphery to provide a first bearing surface which is directed rearward;

an acoustic transducer mounted to the back of the ear plate to direct sound through the acoustic openings;

a back plate fastened to the ear plate to form an ear cup assembly which encloses the acoustic transducer, the back plate including a flange formed on its periphery which defines a second bearing surface which is directed forward toward the first bearing surface and is spaced therefrom to define a channel; and a yoke for attaching the ear cup assembly to a headband, the yoke having a pair of legs which extend around the periphery of the back plate on opposite sides, each leg having a portion which extends into said channel and is entrapped therein to thereby fasten the yoke to the ear cup assembly.

12. The headphone as recited in claim 11, in which the first and second bearing surfaces are contoured at two regions on opposite sides of the ear cup to form constrictions at which points the legs of the yoke are entrapped.

13. The headphone as recited in claim 12 in which the legs of the yoke join to form a ring which encircles the ear assembly.

14. The headphone as recited in claim 11 in which the legs of the yoke join to form a ring which encircles the ear cup assembly.

15. The headphone as recited in claim 11 in which the first bearing surface is contoured to form rearward extending projections on the left and right sides of the ear cup assembly and the second bearing surface is contoured to form a pair of notches which receive the projections, and in which the legs of the yoke are joined to form a ring and bights are formed on opposite sides of the ring and are entrapped between the projections and their corresponding notches to provide a pivotal connection of the ear cup assembly with the yoke.

16. The headphone as recited in claim 15 in which the bearing surfaces are sloped in the regions surrounding the contoured areas to enable the ear cup assembly to pivot with respect to the yoke, and the ring engages said sloped bearing surfaces to limit the extent of pivotal motion.

17. A headphone, which comprises:

a headband for extending over the head of a user;

a yoke having a bracket which connects to one end of the headband and which includes a ring that extends downward from the bracket;

an ear cup assembly disposed within the ring; and means for attaching the ear cup assembly to the ring to enable the ear cup assembly to pivot about a horizontal axis, wherein the ear cup assembly includes a flange which extends completely around its periphery to present an annular shaped bearing surface, the bearing surface having a first sloped portion which engages the ring at points above the horizontal pivot axis when the ear cup assembly is pivoted in one direction, and a second sloped portion which engages the ring at points below the horizontal pivot axis when the ear cup assembly is pivoted in the other direction.

18. The headphone as recited in claim 17 in which said means for attaching includes elements formed on the ring which are received in channels formed on the left and right sides of the ear cup assembly by the assembly of its component parts.

* * * * *